United States Patent
Huang et al.

(10) Patent No.: US 10,816,881 B2
(45) Date of Patent: Oct. 27, 2020

(54) WAVELENGTH CONVERSION MODULE

(71) Applicant: Qisda Corporation, Taoyuan (TW)

(72) Inventors: Li-Jung Huang, Taoyuan (TW); Wen-Chang Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/531,515

(22) Filed: Aug. 5, 2019

(65) Prior Publication Data

US 2020/0050091 A1  Feb. 13, 2020

(30) Foreign Application Priority Data

Aug. 7, 2018  (CN) .......................... 2018 1 0892203

(51) Int. Cl.
| | |
|---|---|
| *F21K 9/64* | (2016.01) |
| *G03B 21/16* | (2006.01) |
| *G02B 26/00* | (2006.01) |
| *G03B 21/20* | (2006.01) |

(52) U.S. Cl.
CPC ........... *G03B 21/16* (2013.01); *G02B 26/008* (2013.01); *G03B 21/204* (2013.01); *F21K 9/64* (2016.08)

(58) Field of Classification Search
CPC .... G03B 21/16; G03B 21/204; G02B 26/008; F21K 9/64; F21V 9/40; F21S 10/007
See application file for complete search history.

(56) References Cited

U.S. PATENT DOCUMENTS

| | | | |
|---|---|---|---|
| 2015/0229892 A1* | 8/2015 | Dai ...................... | G03B 21/204 362/323 |
| 2017/0261844 A1* | 9/2017 | Kitade .................. | G03B 33/08 |
| 2018/0095350 A1* | 4/2018 | Tanaka .................. | F21V 9/30 |
| 2019/0094671 A1* | 3/2019 | Ike ........................ | G02B 26/008 |

FOREIGN PATENT DOCUMENTS

| | | |
|---|---|---|
| CN | 204178109 U | 2/2015 |
| TW | 201805713 A | 2/2018 |

* cited by examiner

*Primary Examiner* — Y M. Quach Lee

(57) ABSTRACT

A wavelength conversion module for being disposed on a light path of light of a projector is provided. The wavelength conversion module includes a driving module and a wheel. The wheel has an axial hole, a heat dissipation area and a complementary dissipation area. The axial hole is connected to the driving module, the heat dissipation area surrounds the axial hole, and the wavelength conversion area surrounds the heat dissipation area and the light is projected to the wavelength conversion area. The heat dissipation area includes a plurality of through holes penetrating through the wheel, in which the plurality of through holes has a plurality of first through holes and a plurality of second through holes. The plurality of first through holes is arranged circularly on the wheel around the axial hole. Each of the plurality of second through holes is arranged between every two adjacent first through holes.

8 Claims, 4 Drawing Sheets

WAVELENGTH CONVERSION MODULE

FIELD OF THE INVENTION

The present invention relates to a wavelength conversion module, and more particularly to a wavelength conversion module for a projector using a color wheel.

BACKGROUND OF THE INVENTION

The digital light processing projector (DLP projector) of prior art utilizes the color wheel to produce light beams of different colors. Specifically, the color wheel is divided into multiple sectors corresponding to different colors. When the color wheel is rotating, the light source projects light onto different color sectors and therefore multiple colors are respectively produced. A common light source of the aforementioned device is blue laser light source with phosphor coated on the color wheel, in which the blue laser excites the phosphor when projected on the color wheel and produces color lights of higher wavelength, such as green light and red light.

Since the color wheel is driven by a motor, the motor often overheats when high heat is produced by the phosphor being excited to covert the wavelength of light, and the heat is often transferred to the motor along the wheel, resulting in malfunction of the color wheel and reducing the lifespan of the motor. Furthermore, a common solution to overheat is to install some heat dissipation device near the color wheel or to increase the heat dissipation efficiency of the dissipation fan. However, the installation of extra heat dissipation device incurs extra costs, and the dissipation fan may make undesired noise. Therefore, there is still room for improvement as to projectors of prior art.

SUMMARY

One embodiment of the present invention provides a wavelength conversion module for being disposed on a light path of light emitted from a projector. The wavelength conversion module includes a wheel and a wavelength conversion layer. The wheel has a first surface and a second surface facing away from the first surface. The first surface includes a wavelength conversion area and a heat dissipation area, in which the wavelength conversion area surrounds the heat dissipation area. The heat dissipation area includes a plurality of through holes penetrating through the wheel and connecting the first surface and the second surface. The wavelength conversion module is disposed on the wavelength conversion area of the first surface for converting the wavelength of the light. The wavelength conversion module has a resonance frequency f, each through hole has a diameter d, a distance D is provided between every two adjacent through holes, and the resonance frequency f, the diameter d, and the distance D satisfy the relation:

$$f = \frac{c}{2\pi}\sqrt{\frac{\left(\frac{\pi d^2}{4D^2}\right)}{(t+0.8)L}},$$

wherein c is the speed of light, t is a thickness of the wheel, and L is a thickness of an air layer on the second surface of the wheel.

Another embodiment of the present invention provides a wavelength conversion module for being disposed on a light path of light emitted from a projector. The wavelength conversion module includes a wheel and a wavelength conversion layer. The wheel has a first surface and a second surface facing away from the first surface. The first surface includes a wavelength conversion area, a heat dissipation area and a complementary dissipation area. The wavelength conversion area surrounds the heat dissipation area, and the complementary dissipation area surrounds the wavelength conversion area, wherein the heat dissipation area includes a plurality of through holes penetrating through the wheel and connecting the first surface and the second surface. The wavelength conversion layer is disposed on the wavelength conversion area of the first surface for converting the wavelength of the light.

Another embodiment of the present invention provides a projector including the aforementioned wavelength conversion module and a driving module connected to the wavelength conversion module so as to drive the wheel.

Another embodiment of the present invention provides a wavelength conversion module for being disposed on a light path of light emitted from a projector. The wavelength conversion module includes a driving module and a wheel. The wheel has an axial hole, a heat dissipation area and a complementary dissipation area. The axial hole is connected to the driving module, the heat dissipation area surrounds the axial hole, and the wavelength conversion area surrounds the heat dissipation area. The heat dissipation area includes a plurality of through holes penetrating through the wheel. The plurality of through holes has a plurality of first through holes and a plurality of second through holes. The plurality of first through holes is arranged circularly on the wheel around the axial hole, and each of the plurality of second through holes is arranged between every two adjacent first through holes and closer to the wavelength conversion area than the two adjacent first through holes.

In order to further the understanding of the present disclosure, reference is made to the following detailed description illustrating the embodiments and examples of the present disclosure. The description is for illustrative purpose only and is not intended to limit the scope of the claim.

DETAILED DESCRIPTION OF EMBODIMENTS

The projector and the wavelength conversion module thereof provided by the present invention are described below with reference to FIG. 1 to FIG. 4C. The aforementioned illustrations and following detailed descriptions are exemplary for the purpose of further explaining the scope of the present disclosure. Other objectives and advantages related to the present disclosure will be illustrated in the subsequent descriptions and appended drawings. Furthermore, the drawings are for explanatory purposes only, and the components shown therein may not be drawn according to actual sizes. In addition, terms such as "the first" and "the second" are used to distinguish one component from another. The mentioned components are not to be limited by such terms.

First Embodiment

Figure 1:
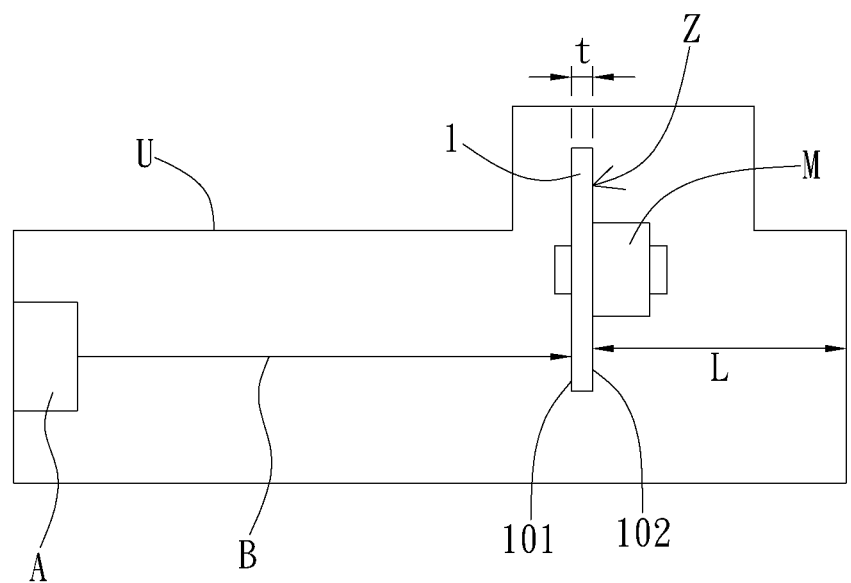
FIG. 1 shows a schematic view of a projector according to a first embodiment of the present invention.

Referring to FIG. 1, the first embodiment of the present invention provides a projector U, which includes a wavelength conversion module Z, a light source module A, and a driving module M. The wavelength conversion module Z has a wheel 1 driven by the driving module M. The wheel 1 has a first surface 101 and a second surface 102, and receives light B from the light source module A. In the present embodiment, the projector type wherein light from the light source penetrates the wheel is used, such as the projector U of FIG. 1. However, the present invention is not limited thereto. In other embodiments, the projector U can also utilize the projector type where light B from the light source module A is reflected by the wavelength conversion module Z to form images.

Figures 2A, 2B, 2C:
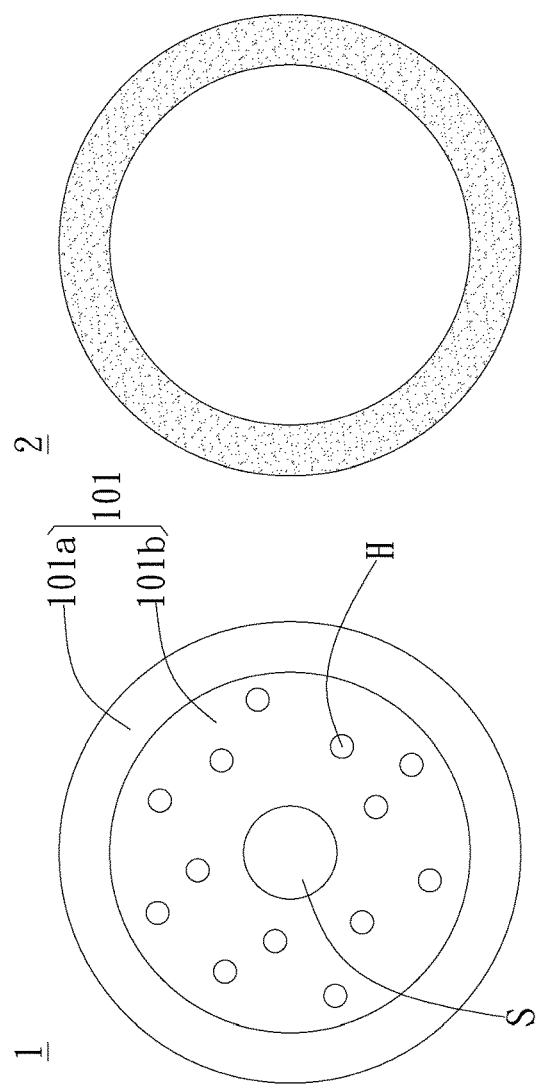
FIG. 2A to FIG. 2C respectively show a wheel, a wavelength conversion layer and a wavelength conversion module according to the first embodiment of the present invention.

Please refer to FIG. 1 and FIG. 2A. FIG. 2A shows the wheel 1 of FIG. 1 from another viewing angle. In the present embodiment, the first surface 101 of the wheel 1 has a wavelength conversion area 101a and a heat dissipation area 101b, in which the wavelength conversion area 101a surrounds the heat dissipation area 101b. The heat dissipation area 101b includes a plurality of through holes H penetrating the wheel 1 and connecting the first surface 101 and the second surface 102. The wheel 1 is connected to the driving module M through the axial hole S.

With reference to FIG. 2B, the wavelength conversion module Z further includes a wavelength conversion layer 2 disposed on the wavelength conversion area 101a of the wheel 1, as shown in FIG. 2C. The wavelength conversion layer 2 can be made of materials that convert the wavelength of light B and reflect the converted light out of the projector U. It is noted that the wavelength conversion module Z is applied to the penetrating type of projector U as shown in FIG. 1; however, the present invention is not limited thereto. In other embodiments, the wavelength conversion module Z can also be applied to a projector U with a reflective light path. For instance, in such projector U, light B is reflected by the wavelength conversion layer 2 onto an image forming module, e.g. digital micromirror device, and projected out of the projector U by the image forming module.

Referring to FIG. 1 and FIG. 2C, in the present embodiment, the wavelength conversion module Z has a resonance frequency f, each through hole H has a diameter d, and a distance D is provided between every two adjacent through holes H. The resonance frequency f, the diameter d, and the distance D satisfy the following relation:

$$f = \frac{c}{2\pi}\sqrt{\frac{\left(\frac{\pi d^2}{4D^2}\right)}{(t+0.8)L}},$$

in which c is the speed of light, t is a thickness of the wheel 1, and L is a thickness of an air layer on the second surface 102 of the wheel 1. More specifically, as shown in FIG. 2C, the thickness L is the vertical distance between the projector U and the part of the second surface 102 corresponding to the part of the first surface 101 receiving the light B. In the present embodiment, the resonance frequency f that satisfies the above equation can be achieved with the diameter d of the through holes H and the distance D between through holes H also satisfying the above equation. In this way, when the resonance frequency f equals the frequency at which noise reduction is needed when operating the projector U, making the resonance frequency f satisfy the above equation can reduce noise at the same frequency. In other words, when a noise frequency f' to be eliminated is determined, the noise can be eliminated by adjusting the size of the through holes H and the spacing distance D therebetween such that the resonance frequency f of the wavelength conversion module Z equals the noise frequency f'.

More specifically, the diameter d of the through holes H is preferably 3 mm to 6 mm, and the distance D is preferably 5 mm to 30 mm. In addition, the through holes H on the heat dissipation area 101b has a total hole area, and the ratio of the total hole area to the area of the heat dissipation area 101b preferably ranges from 5% to 20%. However, the present invention is not limited thereto.

Figure 3:
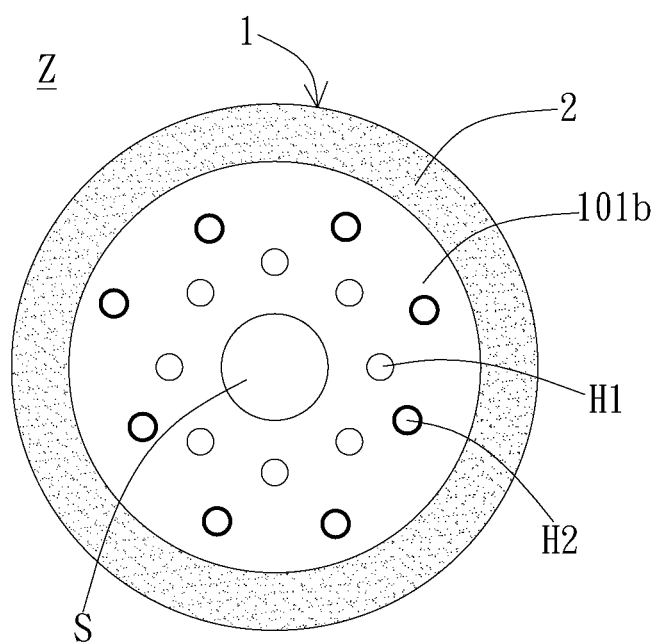
FIG. 3 shows a varied embodiment of the wavelength conversions module according to the first embodiment of the present invention.

Please refer to FIG. 3, which shows another embodiment of the first embodiment. The embodiment provides another way of arranging the through holes H. As shown in FIG. 3, the through holes H includes a plurality of first through holes H1 and a plurality of second through holes H2. The plurality of first through holes H1 is arranged circularly on the wheel 1 around the axial hole S, and each of the plurality of second through holes H2 is arranged between every two adjacent first through holes H1. In addition, the second through holes H2 are closer to the wavelength conversion area 101a, which is covered by the wavelength conversion layer 2 in FIG. 3, than said two adjacent first through holes H1. More specifically, by arranging the first through holes H1 to surround the axial hole S, and arranging the second through holes H2 to surround the axial hole S alternately with respect to the first through hole H1, heat produced by the wavelength conversion layer 2 can be more effectively prevented from being transferred to the axial hole S along the radius direction.

With the aforementioned technical solution in which a plurality of through holes H are disposed on the heat dissipation area 101b, and the diameter d of the through holes H and the distance D between the through holes H are adjusted to conform to $$f = \frac{c}{2\pi}\sqrt{\frac{\left(\frac{\pi d^2}{4D^2}\right)}{(t+0.8)L}},$$

the present invention can reduce noise by achieving a resonance frequency f of the wavelength conversion module Z that equals the noise frequency. In addition, the wavelength conversion module Z performs heat dissipation via the through holes H to reduce waste heat produced by the wavelength conversion layer 2, thereby preventing the driving module M from overheating by receiving the heat transferred from the wavelength conversion layer 2.

It should be noted that the through holes H can further help achieve a counterbalance effect. For instance, when the size and arrangement of the through holes H satisfy the resonance frequency equation stated above and can prevent heat from transferring to the driving module M, a counterbalance effect can be achieved by further adjusting the positions of the through holes H.

Second Embodiment

Figure 4C:
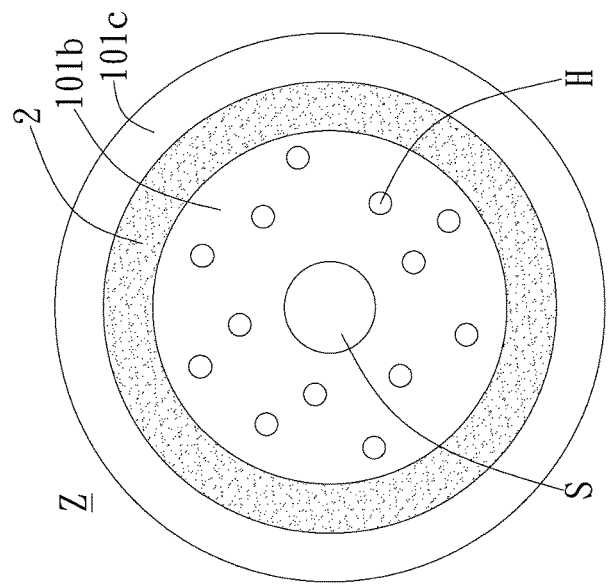
FIG. 4A to FIG. 4C respectively show a wheel, a wavelength conversion layer and a wavelength conversion module according to a second embodiment of the present invention.
Figure 4B:
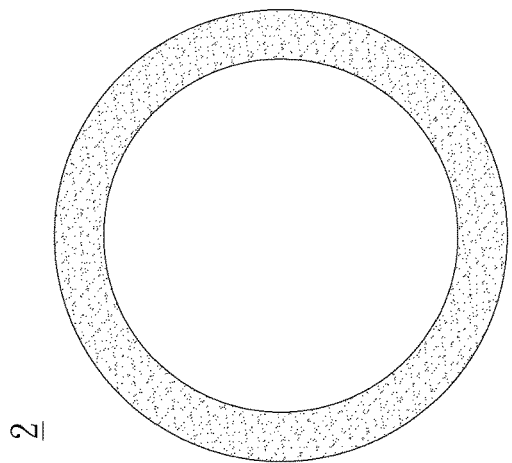
Figure 4A:
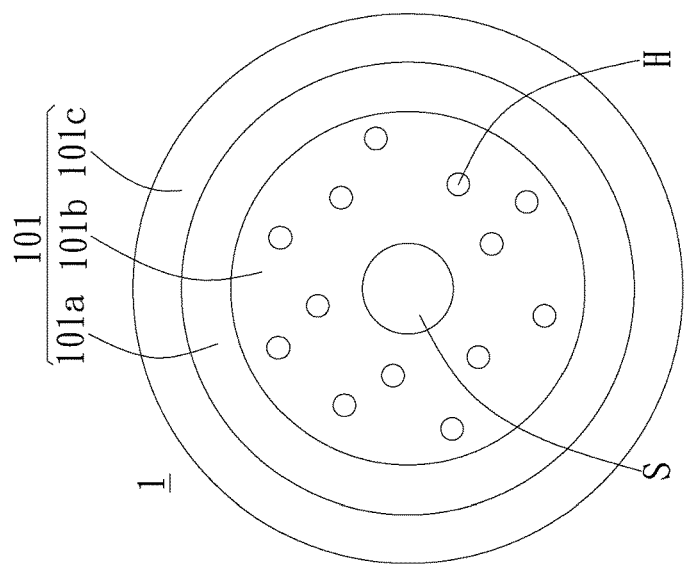

Please refer to FIG. 4A to FIG. 4C, which illustrate the wheel 1, the wavelength conversion layer 2, and the wavelength conversion module Z according to the present embodiment of the present invention. The components that the first embodiment and the second embodiment share will not be further described therein, since they have similar function in both embodiments. Referring to FIG. 4A, the main difference between the first embodiment and the second embodiment is that the first surface 101 of the wheel 1 of the second embodiment has a wavelength conversion area 101a, a heat dissipation area 101b, and a complementary dissipation area 101c. The wavelength conversion area 101a surrounds the heat dissipation area 101b, and the complementary dissipation area 101c surrounds the wavelength conversion area 101a.

More specifically, the complementary dissipation area 101c is preferably made of a metal material. The complementary dissipation area 101c serves to compensate for the loss of dissipation area on the heat dissipation area 101b due to the through holes H. Therefore, the volume of the complementary dissipation area 101c can approximately equal that of the through holes H so as to compensate for the loss of heat dissipation area due to the through holes H. The complementary dissipation area 101c can extend radially away from the axial hole S so as to be able to dissipate heat produced by the wavelength conversion layer 2, thereby enhancing the efficiency of heat dissipation of the wavelength conversion module Z and preventing the driving module M from overheating.

In summary, the projector U and the wavelength conversion module Z provided by the embodiments of the present invention can achieve "the wavelength conversion module Z has a resonance frequency f that satisfies $$f = \frac{c}{2\pi} \sqrt{\frac{\left(\frac{\pi d^2}{4D^2}\right)}{(t+0.8)L}},$$

by the technical solutions of "the heat dissipation area 101b includes a plurality of through holes H penetrating the wheel 1 and connecting the first surface 101 and the second surface 102" and "each through hole H has a diameter d, and a distance D is provided between every two adjacent through holes H".

The descriptions illustrated supra set forth simply the embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A wavelength conversion module, used for being disposed on a light path of light emitted from a projector, the wavelength conversion module comprising:
   a wheel having a first surface and a second surface facing away from the first surface, the first surface including a wavelength conversion area and a heat dissipation area, and the wavelength conversion area surrounding the heat dissipation area, wherein the heat dissipation area includes a plurality of through holes penetrating through the wheel and connecting the first surface and the second surface; and
   a wavelength conversion layer disposed on the wavelength conversion area of the first surface and for converting the wavelength of the light,
   wherein the wavelength conversion module has a resonance frequency f, each through hole has a diameter d, a distance D is provided between every two adjacent through holes, and the resonance frequency f, the diameter d, and the distance D satisfy the relation:

$$f = \frac{c}{2\pi} \sqrt{\frac{\left(\frac{\pi d^2}{4D^2}\right)}{(t+0.8)L}},$$

wherein c is the speed of light, t is a thickness of the wheel, and L is a thickness of an air layer on the second surface of the wheel.

2. The wavelength conversion module according to claim 1, wherein the plurality of through holes has a total hole area, the ratio of the total hole area to the area of the heat dissipation area ranging from 5% to 20%.

3. The wavelength conversion module according to claim 1, wherein the diameter d ranges from 3 mm to 6 mm.

4. The wavelength conversion module according to claim 1, wherein the distance D ranges from 5 mm to 30 mm.

5. The wavelength conversion module according to claim 1, wherein the wheel has an axial hole used for being connected to a driving module, the heat dissipation area of the first surface surrounding the axial hole, wherein the plurality of through holes includes a plurality of first through holes and a plurality of second through holes, the plurality of first through holes being arranged circularly on the wheel around the axial hole, and each of the plurality of second through holes being arranged between every two adjacent first through holes and closer to the wavelength conversion area than the two adjacent first through holes.

6. A wavelength conversion module for being disposed on a light path of light emitted from a projector, the wavelength conversion module comprising:
   a wheel having a first surface and a second surface facing away from the first surface, the first surface including a wavelength conversion area, a heat dissipation area and a complementary dissipation area, the wavelength conversion area surrounding the heat dissipation area, and the complementary dissipation area surrounding the wavelength conversion area, wherein the heat dissipation area includes a plurality of through holes penetrating through the wheel and connecting the first surface and the second surface; and
   a wavelength conversion layer disposed on the wavelength conversion area of the first surface for converting the wavelength of the light,
   wherein the wavelength conversion module has a resonance frequency f, each through hole has a diameter d, a distance D is provided between every two adjacent through holes, and the resonance frequency f, the diameter d, and the distance D satisfy the relation $$f = \frac{c}{2\pi} \sqrt{\frac{\left(\frac{\pi d^2}{4D^2}\right)}{(t+0.8)L}},$$

wherein c is the speed of light, t is a thickness of the wheel, and L is a thickness of an air layer on the second surface of the wheel.

7. The wavelength conversion module according to claim 6, wherein the diameter d ranges from 3 mm to 6 mm.

8. The wavelength conversion module according to claim 6, wherein the distance D ranges from 5 mm to 30 mm.

* * * * *